United States Patent [19]

Rutten et al.

[11] 4,029,219

[45] June 14, 1977

[54] BOTTOM GRAIN UNLOADER

[75] Inventors: Donald E. Rutten, Plainfield;
Richard A. Davis, Joliet, both of Ill.

[73] Assignee: P & D Manufacturing Co., Inc.,
Plainfield, Ill.

[22] Filed: Dec. 17, 1975

[21] Appl. No.: 641,509

[52] U.S. Cl. .......................................... 214/17 DA
[51] Int. Cl.² ...................................... B65G 65/46
[58] Field of Search ............ 214/17 D, 17 A, 17 R,
214/17 DA; 222/236, 232, 303, 318

[56] References Cited

UNITED STATES PATENTS

| | | | |
|---|---|---|---|
| 2,604,217 | 7/1952 | Shaw | 222/236 X |
| 3,064,831 | 11/1962 | Cook | 214/17 DA |
| 3,151,749 | 10/1964 | Long | 214/17 DA |
| 3,233,755 | 2/1966 | Glenn | 214/17 DA |
| 3,260,382 | 7/1966 | Klover | 214/17 D |
| 3,532,232 | 10/1970 | Sukup | 214/17 DA |
| 3,536,210 | 10/1970 | Dickinson | 214/17 DA |
| 3,851,774 | 12/1974 | Laidig et al. | 214/17 DA |

*Primary Examiner*—Albert J. Makay
*Attorney, Agent, or Firm*—Allegretti, Newitt, Witcoff & McAndrews

[57] ABSTRACT

An improved bottom grain bin auger discharge construction includes a hopper centrally disposed in the bottom of a grain storage bin. A grain tube extends from the hopper to the outside of the bin and includes a discharge auger for moving the grain in the tube. A separate transfer or sweep auger is positioned within the bin extending outward from the hopper. The sweep auger is driven through a linkage including a drive shaft extending from outside the bin to a gear box positioned within the hopper. The discharge auger associated with the grain tube is driven by the same motor through a separate linkage. The linkages are arranged for separate and sequential control of the sweep auger and the discharge auger.

4 Claims, 8 Drawing Figures

BOTTOM GRAIN UNLOADER

BACKGROUND OF THE INVENTION

This invention relates to an improved auger construction for removal of a particulate material or silage from a bin.

Storage of silage or particulate grain material in bins for use on a farm has been common practice. Numerous devices have been proposed and used for the removal of such materials from the bins. Generally, such constructions include a discharge tube and discharge auger positioned within the bin and leading from an internal hopper to the outside of the bin. Particulate material or silage then flows into the hopper and is transported by the auger through the discharge tube.

When grain is stored in the bin, it flows into the hopper so long as the bin is adequately filled. As the bin becomes nearly empty, however, grain will no longer flow into the hopper but will remain at the natural angle of repose around the hopper. In order to remove last amounts of grain from the bin, a mechanism must be provided within the bin which will move the grain into the hopper.

Numerous constructions have been proposed. Typical of those constructions is the device illustrated in U.S. Pat. No. 3,536,210, wherein an auxiliary or sweep auger is shown maintained in a shroud within a grain storage bin. The auxiliary auger is operated to remove grain from the floor of the bin to the hopper. The auxiliary auger is driven through a gear train which includes the primary discharge auger.

Hildebrand U.S. Pat. No. 3,250,407 illustrates a similar construction. In the Hildebrand patent, a pair of bin discharge augers connect with a central hopper. The bin discharge augers are driven by a first motor. A separate motor mounted outside the bin drivers an auxiliary or sweep auger within the bin.

While such prior art constructions are of great utility, a problem common to many such constructions is that the clutch mechanism associated with operation of the auxiliary or sweep auger is necessarily maintained within the interior of the bin. A clutch drive is required since the discharge auger and sweep auger do not necessarily operate simultaneously. The discharge auger is, for example, likely to be operated more than the sweep auger. Thus, a clutch must be provided between the drive mechanism and the sweep auger. Such a clutch is normally positioned under the bin floor or in the hopper. As a result access for repair of the clutch mechanism is difficult. In order to overcome such problems, the apparatus of the present invention was conceived.

SUMMARY OF THE INVENTION

In a principal aspect, the present invention relates to an improved construction for removal of material from a storage bin comprising a hopper disposed at the bottom of the bin, a removal passage from the hopper to outside of the bin, means within the passage for transferring the material from the hopper, drive means outside of the bin for operating the means for transferring, separate material transport means projecting from the hopper into the interior of the bin, separate drive train linkage means from the drive means drivingly connected to the transport means, and clutch means outside of the bin for the separate linkage means.

It is thus an object of the present invention to provide an improved construction for removal of particulate material from a storage bin.

It is a further object of the present invention to provide an improved grain storage bin removal device including a discharge auger from a hopper within the bin and a sweep auger for transferring material into the hopper.

Still another object of the present invention is to provide a grain discharge mechanism having a separate sweep auger and a separate discharge auger driven by the same motor wherein at least the sweep auger is operated through a separate clutch construction.

One further object of the present invention is to provide an improved grain discharge contruction including a discharge auger and a sweep auger wherein the sweep auger is directly driven by a motor external the bin through a clutch mechanism also external the bin.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
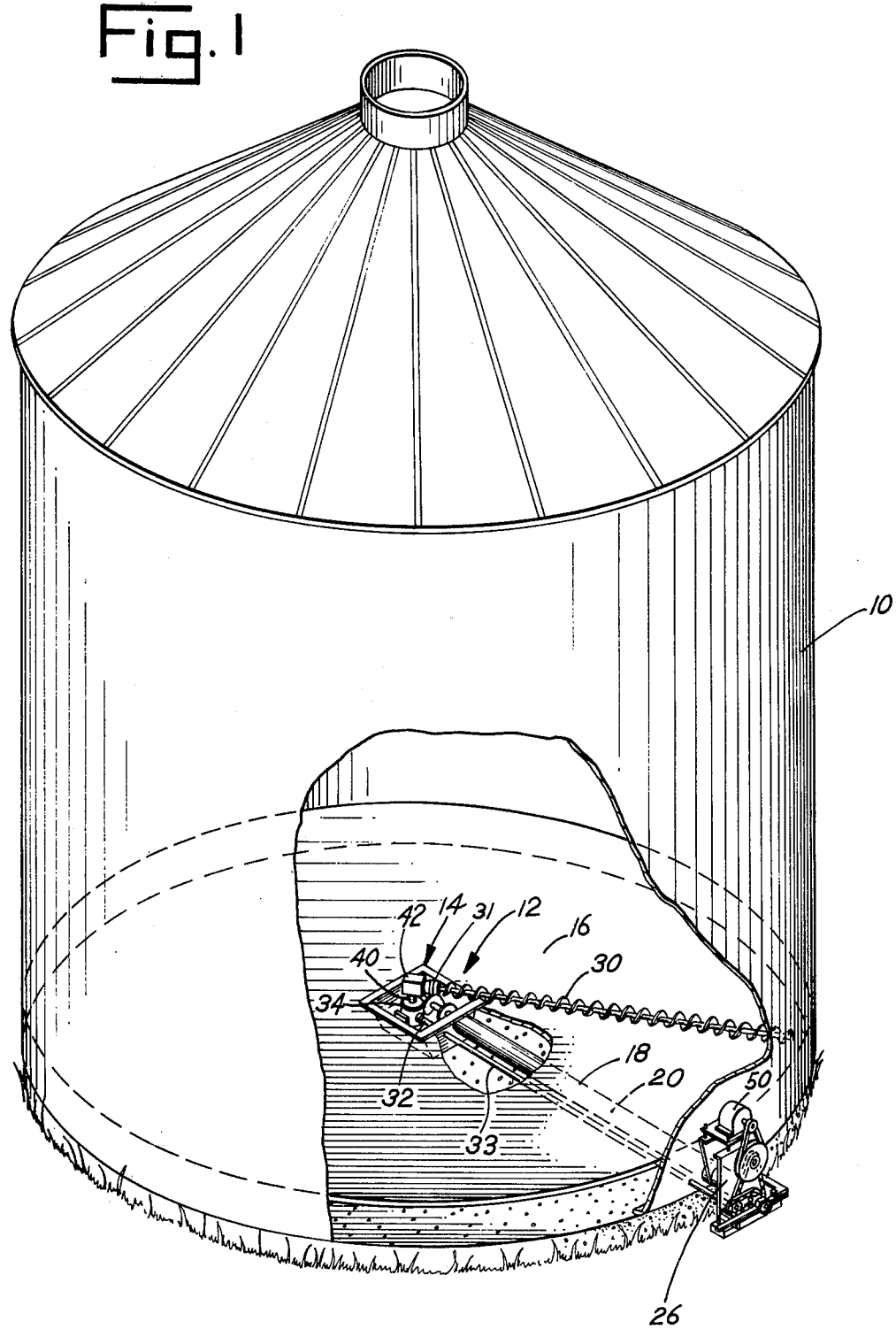
FIG. 1 is a cut-away perspective view of the improved auger construction of the present invention.
Figure 2:
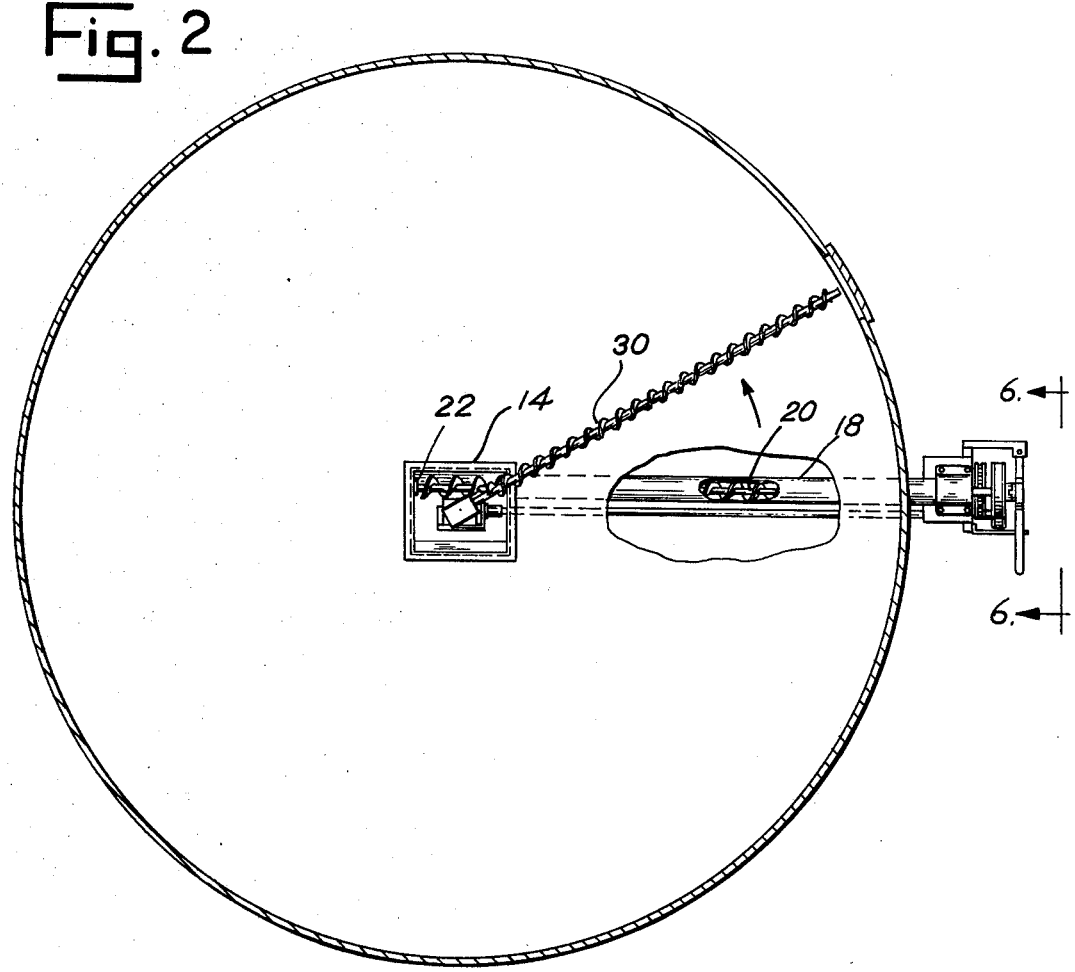
FIG. 2 is a top plan view of the auger construction illustrated in FIG. 1.
Figure 3:
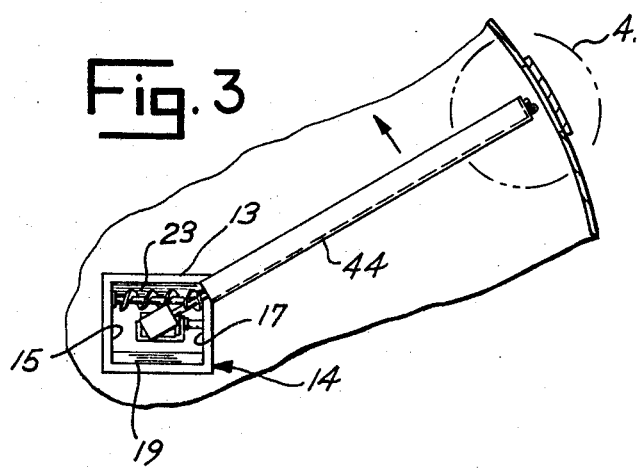
FIG. 3 is a partial plan view of the sweep auger configuration shown in FIG. 1.
Figure 4:
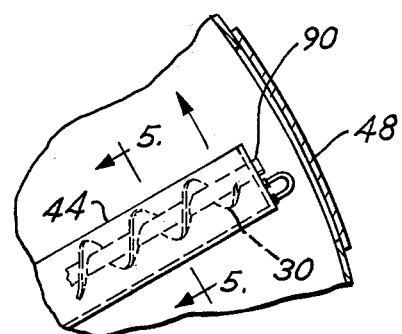
FIG. 4 is an enlarged plan view of the end of the sweep auger as illustrated in FIG. 3.
Figure 5:
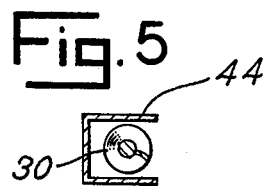
FIG. 5 is a cross-sectional view of the sweep auger taken along the line 5—5 in FIG. 4.
Figure 6:
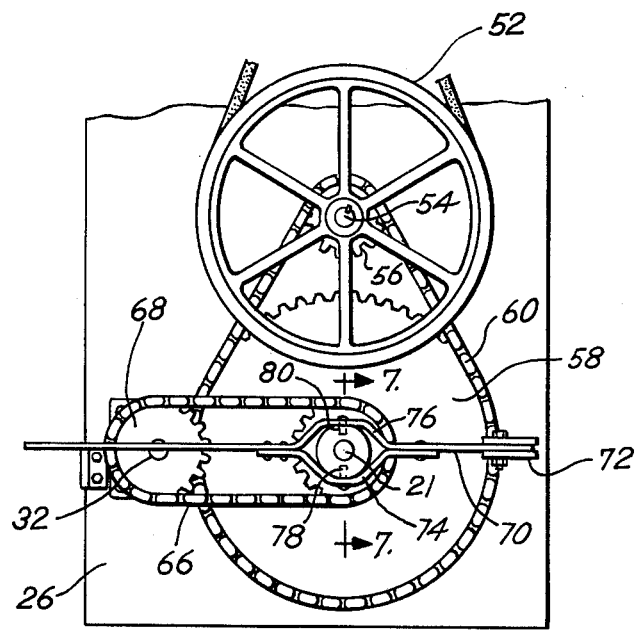
FIG. 6 is an elevation of the driven means for the augers of the present invention taken along the line 6—6 in FIG. 2.

The bottom grain unloader of the present invention is generally used in combination with a grain storage bin 10 of the type illustrated in FIG. 1. The bin unloader generally shown at 12 is positioned at the bottom of the bin 10. More particularly, a hopper 14 is located in floor 16 of bin 10 with the top edge of flange 13 of the hopper 14 being substantially level with the floor 16. Generally, the floor 16 is level, though it is possible that the floor 16 may have a conical shape in order to facilitate flow of the contents of the bin 10 into the hopper 14. Hopper 14 includes first and second opposed, vertical end walls 15 and 17, respectively, and tapered, opposed side walls 19 and 23.

The unloader 12 also includes a grain discharge tube 18 which leads from the interior of the hopper 14 under the floor 16 to outside of the bin 10. A discharge or transfer auger 20 is maintained within the tube 18. The auger 20 is mounted on shaft 21 which is journaled at one end in bearing 22 in the vertical end wall 15 of hopper 14. The opposite end of the shaft 21 of auger 20 is journaled in a bearing 24 fixed in mounting plate 26 attached to the outside end of tube 18. This is illustrated, in part, in FIG. 1. Note that tube 18 is supported by the walls of the bin 10, thus eliminating the need for a separate support platform for the auger construction.

Thus, a shaft 21, of the discharge auger 20, may be driven to effect removal of grain through tube 18 from the hopper 14 on the interior of the bin 10. Operation of auger 20 in the described manner will remove the majority of the grain, silage or other material from the bin 10. That is, grain which is removed from the bottom of the bin 10 will naturally flow into the hopper 14 until the grain remaining in the bin 10 assumes a natural angle of repose and will not flow of its own accord into hopper 14. Note that tapered walls 19 and 23 of hopper 14 are generally parallel with the shaft 21 and inclined downwardly toward each other to provide a funnel action.

To remove the remaining material from the bin 10, a sweep auger 30 is provided to transfer material to hopper 14. Sweep auger 30 is driven separately from discharge auger 20. That is, a separate drive shaft 32 extends through a bearing in plate 26 and a protective tube or housing 33 parallel to tube 18 under bin 10 into the hopper 14. Shaft 32 extends into the gear housing 34 which is mounted in hopper 14 and operates to drive bevel gears 36 and 38 thereby driving output shaft 40. Vertical output shaft 40 from housing 34 drives gear 37 which, in turn, drives gear 39 in a gear box 42 above the level of floor 16. Output shaft 41 from gear box 42 drives the sweep auger 30 through a flexible coupling 31.

The sweep auger 30 is normally maintained within a shroud 44 in a locked, immobile position by means of bearing 90 which receives the end of auger 30. So long as the shroud 44 is locked in position, the auger 30 is maintained in position until access door 48 in the wall of bin 10 is opened to remove shroud 44 and thereby effecting release of sweep auger 30 for rotation and movement about the floor 16.

The drive train for the augers 20 and 30 is shown in FIGS. 1, 6, 7 and 8. A single motor 50 drives a wheel 52 by means of a pulley drive. Wheel 52 is keyed to shaft 54. Shaft 54 is appropriately mounted in bearings of plate 26. Also, keyed to shaft 54 is sprocket 56 which drives a larger sprocket 58 keyed to shaft 21. Drive chain 60 connects sprocket 56 with sprocket 58. As previously described, shaft 21 serves as th drive shaft for the discharge auger 20. Thus, operation of the motor 50 effects operation of the auger 20.

Figure 7:
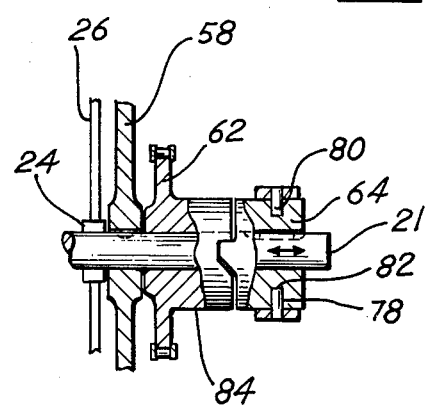
FIG. 7 is a cross-sectional view of the clutch mechanism for the sweep auger taken along the line 7—7 in FIG. 6.
Figure 8:
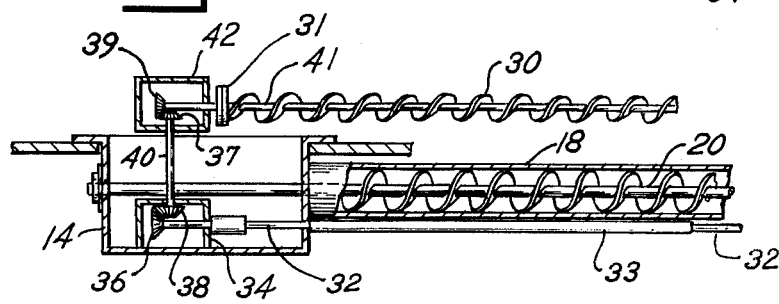
FIG. 8 is an enlarged cross-section view of the sweep auger mechanism.

As shown in FIG. 7, the shaft 21 projects outwardly beyond sprocket 58 and includes a free-wheeling idler sprocket 62 adjacent drive sprocket 58. A driving clutch member 64 is keyed for rotation with shaft 21 and is slidable longitudinally along the axis of the shaft 21. Idler sprocket 62 is coupled by drive chain 66 with drive sprocket 68 which, in turn, is keyed to drive shaft 32.

The clutch mechanism includes a clutch drive arm 70 pivotally mounted on a bracket 72. The arm 70 includes opposed members 74 and 76 having opposed pins 78 and 80 respectively. The pins 78 and 80 fit within a circumferential slot 82 extending around the periphery of the driving clutch member 64. Thus, the pins 78 and 80 slide in the slot 82 as the driving clutch member 64 rotates on shaft 21. Manual movement of the arm 70 causes the driving clutch member to move inwardly or outwardly on shaft 21 as indicated in FIG. 7. In order to engage the driving clutch member 64 with a driven clutch member 84 associated with sprocket 62, the arm 70 is moved to effect movement of member 64 to the left in FIG. 7. In this manner, operation of the motor 50 through the described linkage will cause operation of the drive shaft 32 and thus the auger 30. Disengagement of the clutch member 64 is effected by movement to the right in FIG. 7.

Thus, it can be seen by the structure of the present invention, a discharge auger is operated by a motor external the bin. A sweep auger is operated by the same motor. However, operation is effected through a separate distinct drive linkage means which is clutched to the drive motor at a position outside of the bin. In this manner, the gear boxes and drive train associated with the sweep auger may be completely encased in dust tight structures. Any repairs required to the clutch mechanism may be easily effected outside of the bin. Moreover, separate operation of the discharge auger 20 and sweep auger 30 are maintained. These separate operations may also be considered sequential since the sweep auger 30 operates only when or following the discharge auger. Therefore, while in the foregoing a preferred embodiment of the present invention has been described, it is to be understood that the invention shall be limited only by the following claims and their equivalents.

What is claimed is:

1. An improved auger discharge construction for removal of material from the bottom of a bin, comprising, in combination:
    a hopper at the bottom of the bin substantially at the center thereof;
    a removal tube extending from the hopper to outside the bin;
    a removal auger in the removal tube having a shaft;
    drive means outside the bin;
    a first drive linkage from the drive means drivably connected to the shaft of the removal auger;
    a sweep auger extending from the hopper into the bin;
    a sweep auger drive shaft from the hopper to outside the bin;
    gear means in the hopper connecting the drive shaft to the sweep auger;
    a second drive linkage from the removal auger shaft drivably connected to the sweep auger drive shaft, including a drive sprocket keyed to the sweep auger drive shaft, an idler sprocket on the removal auger shaft free-wheeling therefrom, and a drive chain connecting the idler sprocket with the drive sprocket; and
    a clutch intermediate the first drive linkage and the second drive linkage, including a driven clutch member unitary with the idler sprocket and a driving clutch member slidable longitudinally along the axis of the discharge auger shaft and keyed for rotation therewith, said driving clutch member having a circumferential slot around the periphery, and a clutch drive arm having opposed members with opposed pins which extend into the circumferential slot of the driving clutch member, said clutch drive arm for sliding the driving clutch member into and out of engagement with the driven clutch member.

2. The improved construction of claim 1, wherein said bin has a circumferential bin wall and said sweep auger has a free end near the bin wall, including: a shroud within which the sweep auger mauy be maintained, said shroud free of support from the bin and lockable to the free end of the sweep auger.

3. The improved construction of claim 2, wherein said shroud has a bearing to receive the free end of the sweep auger, said bearing for locking said shroud in position.

4. The improved construction of claim 3, including means in said bin wall for access to said shroud for unlocking and removing the shroud from the interior of the bin.

* * * * *